US009831798B2

(12) United States Patent
Toujinbara (10) Patent No.: US 9,831,798 B2
(45) Date of Patent: Nov. 28, 2017

(54) POWER CONVERSION APPARATUS, POWER GENERATION SYSTEM, AND CONTROL METHOD

(71) Applicant: Kabushiki Kaisha Yaskawa Denki, Kitakyushu-shi (JP)

(72) Inventor: Hirotaka Toujinbara, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 0 days.

(21) Appl. No.: 15/135,999

(22) Filed: Apr. 22, 2016

(65) Prior Publication Data
US 2016/0322899 A1    Nov. 3, 2016

(30) Foreign Application Priority Data
Apr. 28, 2015  (JP) ................. 2015-091164

(51) Int. Cl.
    H02M 7/521    (2006.01)
    H02M 7/48     (2007.01)
    H02J 3/38     (2006.01)
    H02M 1/00     (2006.01)

(52) U.S. Cl.
    CPC ............... *H02M 7/48* (2013.01); *H02J 3/381* (2013.01); *H02M 2001/007* (2013.01)

(58) Field of Classification Search
    CPC .......... H02M 1/32; H02M 7/537; H02M 1/36; H02M 5/4585; H02J 7/345; Y02B 10/72; G05F 1/67
    USPC ........ 363/34, 37, 39, 56.01, 95, 97, 98, 131; 363/132; 318/805, 810, 811; 323/299, 323/906
    See application file for complete search history.

(56) References Cited

U.S. PATENT DOCUMENTS

| 5,347,443 A * | 9/1994 | Muramatsu .......... H02M 5/458 318/778 |
| 5,625,539 A * | 4/1997 | Nakata ................ H02M 7/4807 363/132 |
| 6,046,919 A * | 4/2000 | Madenokouji ............ G05F 1/67 323/906 |
| 6,281,485 B1 * | 8/2001 | Siri ........................... G05F 1/67 126/601 |
| 6,603,672 B1 * | 8/2003 | Deng ...................... H02J 7/345 363/37 |

(Continued)

FOREIGN PATENT DOCUMENTS

| JP | 2005-168213 A | 6/2005 |
| JP | 2011-193633 A | 9/2011 |

OTHER PUBLICATIONS

Office Action dated Nov. 29, 2016 in Japanese Patent Application No. 2015-091164 (with unedited computer generated English translation).

*Primary Examiner* — Rajnikant Patel
(74) *Attorney, Agent, or Firm* — Oblon, McClelland, Maier & Neustadt, L.L.P.

(57) ABSTRACT

A power conversion apparatus includes power conversion circuitry that converts first power supplied from a power source into AC power corresponding to second power of a power system, and control circuitry that instructs, at a time that is determined based on a voltage across a capacitor disposed between the power system and the power conversion circuitry, the power conversion circuitry to start applying an AC voltage to the capacitor.

20 Claims, 5 Drawing Sheets

(56) References Cited

U.S. PATENT DOCUMENTS

| | | | | |
|---|---|---|---|---|
| 6,809,942 B2 * | 10/2004 | Madenokouji | ........ | H02M 7/797 363/132 |
| 6,930,868 B2 * | 8/2005 | Kondo | ................. | H02H 7/1222 361/42 |
| 8,564,261 B2 * | 10/2013 | Yoneda | ................... | H02J 3/383 323/266 |
| 9,473,038 B2 * | 10/2016 | Rodriguez | .............. | H02M 7/48 |
| 2003/0169028 A1 * | 9/2003 | Cohen | ............... | H02M 3/33576 323/288 |
| 2012/0281444 A1 * | 11/2012 | Dent | ....................... | H02M 1/32 363/56.01 |

* cited by examiner

POWER CONVERSION APPARATUS, POWER GENERATION SYSTEM, AND CONTROL METHOD

CROSS-REFERENCE TO RELATED APPLICATIONS

The present application claims priority under 35 U.S.C. §119 to Japanese Patent Application No. 2015-091164, filed Apr. 28, 2015. The contents of this application are incorporated herein by reference in their entirety.

BACKGROUND

Field of the Invention

The embodiments disclosed herein relate to a power conversion apparatus, a power generation system, and a control method.

Discussion of the Background

Japanese Unexamined Patent Application Publication No. 2005-168213 describes a power generation system that supplies energy obtained from sources such as wind power and sunlight. In the power generation system, a power conversion apparatus is disposed between an electric power system and a power generator such as a wind power generator and a solar cell. The power conversion apparatus includes a power converter. The power converter converts electric power generated by the power generator into an alternating-current (AC) power whose frequency accords with the frequency of the electric power system. Then, the power converter outputs the AC power to the electric power system. This kind of power converter includes a switching element to perform switching operations by PWM control.

SUMMARY

According to one aspect of the present disclosure, a power conversion apparatus includes power conversion circuitry that converts first power supplied from a power source into AC power corresponding to second power of a power system, and control circuitry that instructs, at a time that is determined based on a voltage across a capacitor disposed between the power system and the power conversion circuitry, the power conversion circuitry to start applying an AC voltage to the capacitor.

According to another aspect of the present disclosure, a power generation system includes a power conversion apparatus including power conversion circuitry that converts first power into AC power corresponding to second power of a power system, and control circuitry that instructs, at a time that is determined based on a voltage across a capacitor disposed between the power system and the power conversion circuitry, the power conversion circuitry to start applying an AC voltage to the capacitor, and power generating circuitry that is connected to the power conversion circuitry and that generates the first power and supplies the first power to the power conversion apparatus which outputs the AC power to the power system.

According to yet another aspect of the present disclosure, a control method includes determining a time based on a voltage across a capacitor disposed between a power system and power conversion circuitry that converts first power supplied from a power source into AC power corresponding to second power of the power system, and instructing, using control circuitry and at the time that is determined based on the voltage across the capacitor disposed between the power system and the power conversion circuitry, the power conversion circuitry to start applying an AC voltage to the capacitor.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

A power conversion apparatus, a power generation system, a controller, and a control method according to embodiments will be described in detail below by referring to the accompanying drawings. It is noted that the following embodiments are provided for exemplary purposes only and are not intended in a limiting sense.

1. Power Generation System

Figure 1A:
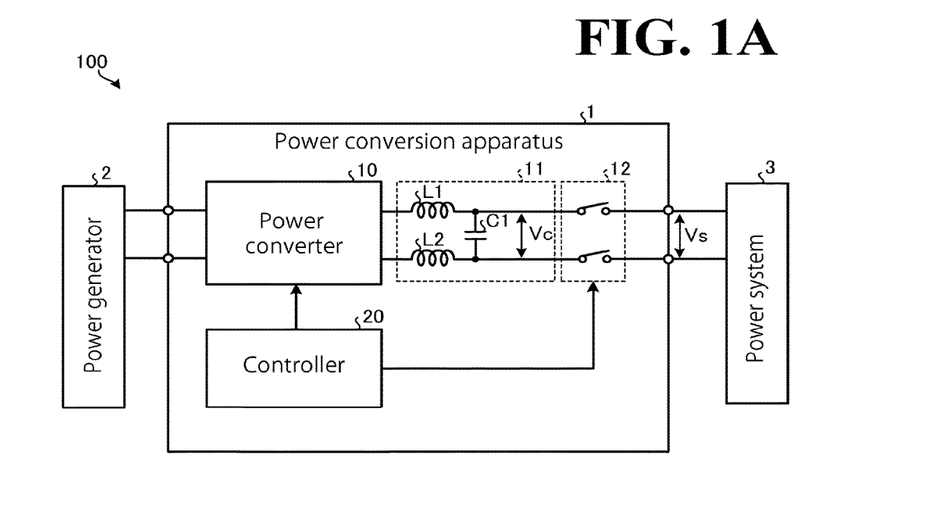
FIG. 1A is a diagram illustrating an exemplary configuration of a power conversion apparatus according to an embodiment.

FIG. 1A is a diagram illustrating an exemplary configuration of a power generation system 100 according to this embodiment. As illustrated in FIG. 1A, the power generation system 100 includes a power conversion apparatus 1 and a power generator 2.

The power conversion apparatus 1 converts a power supplied from the power generator 2, which is a power source, into an AC power corresponding to a power system 3. Then, the power conversion apparatus 1 outputs the AC power to the power system 3. Non-limiting examples of the power generator 2 include an AC power generator and a DC power generator such as a solar cell, DC generation machine, and a fuel cell.

The power conversion apparatus 1 includes a power converter 10, a filter 11, switches 12, and a controller 20. With this configuration, the power conversion apparatus 1 converts a voltage supplied from the power generator 2 into a voltage that accords with the phase, frequency, and amplitude of the voltage, Vs, across the power system 3 (hereinafter referred to as system voltage Vs). Then, the power conversion apparatus 1 outputs the converted voltage to the power system 3.

Under control by the controller 20, the power converter 10 converts the power supplied from the power generator 2 into the AC power corresponding to the power system 3, and outputs the AC power to the power system 3. In a case where the power generator 2 is a DC power generator, the power converter 10 includes, for example, a booster circuit and an inverter. The booster circuit boosts a DC voltage generated by the power generator 2. The inverter converts the voltage boosted by the booster circuit into a voltage corresponding to the power system 3.

In a case where the power generator 2 is an AC power generator, the power converter 10 includes, for example, a converter and an inverter. The converter converts an AC power generated by the power generator 2 into a DC power. The inverter converts the DC power output from the converter into an AC power corresponding to the power system 3.

The filter 11 is an LC filter that includes reactors (L1, L2) and a capacitor C1. The reactors (L1, L2) are respectively connected in series between the switches 12 and the power converter 10. The capacitor C1 is connected between the reactors (L1, L2).

Non-limiting examples of the switches 12 are electromagnetic relays connected between the filter 11 and the power system 3. The switches 12 connect and disconnect the power converter 10 and the power system 3 to and from each other.

The controller 20 controls the power converter 10 to output the AC voltage corresponding to the system voltage Vs. The controller 20 also controls the switches 12 to connect and disconnect the power converter 10 and the power system 3 to and from each other.

Figure 1B:
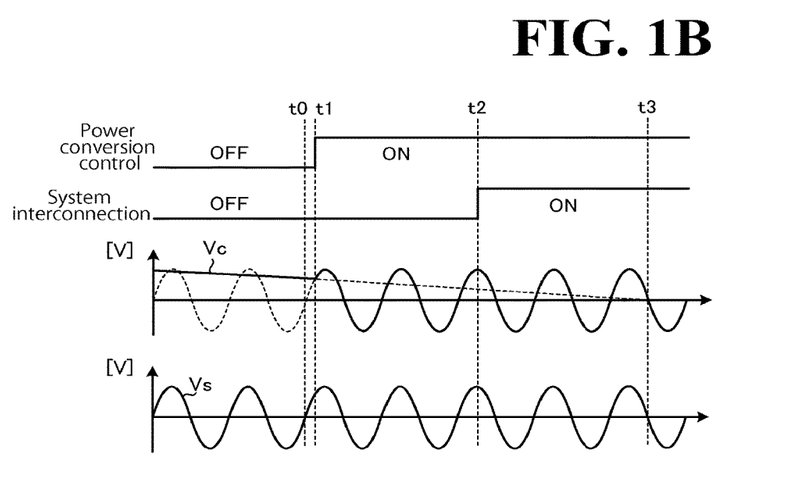
FIG. 1B illustrates timings at which to start applying AC voltage.

FIG. 1B illustrates an example of control performed by the controller 20 with respect to the power converter 10 and the switches 12. As illustrated in FIG. 1B, until time t1, the system interconnection of the power conversion apparatus 1 is off. Specifically, the controller 20 keeps the switches 12 off so that the power converter 10 and the power system 3 are disconnected from each other. Also, the controller 20 is stops its power conversion control with respect to the power converter 10.

Then, at time t1, the controller 20 starts its power conversion control with respect to the power converter 10. Time t1 is a timing that is based on the voltage across the capacitor C1 (hereinafter referred to as capacitor voltage Vc). For example, time t1 is a timing at which the capacitor voltage Vc and the system voltage Vs match. After the start of the power conversion control with respect to the power converter 10, the controller 20, at time t2, turns the switches 12 on to connect the power converter 10 and the power system 3 to each other. In this manner, the controller 20 starts the system interconnection.

Thus, the controller 20 starts, at the timing that is based on the capacitor voltage Vc, the control to apply the AC voltage to the capacitor C1 (this control will be hereinafter referred to as AC voltage application control). This configuration eliminates or minimizes occurrence of an overcurrent between the power converter 10 and the capacitor C1 irrespective of the level of the capacitor voltage Vc, and ensures comparatively quick start of the AC voltage application control.

For example, even if a residual voltage exists across the capacitor C1, the AC voltage application control starts at a timing that is based on the level of the residual voltage of the capacitor. This configuration enables the AC voltage application control to start without waiting for the timing at which the capacitor voltage Vc is zero (for example, t3 illustrated in FIG. 1B) while at the same time eliminating or minimizing occurrence of an overcurrent between the power converter 10 and the capacitor C1.

For another example, a residual voltage exists across the capacitor C1 and the AC voltage application control starts at a zero crossing point of the system voltage Vs (for example, time t0 illustrated in FIG. 1B). In this case, the AC voltage is applied to the capacitor C1 from the power converter 10 with a comparatively large difference between the capacitor voltage Vc and the system voltage V. This creates a possibility of occurrence of an overcurrent between the power converter 10 and the capacitor C1 through the reactors L1 and L2.

As described above, the power conversion apparatus 1 according to this embodiment eliminates or minimizes occurrence of an overcurrent. Eliminating or minimizing occurrence of an overcurrent in turn eliminates or minimizes degradation of, for example, a switching element of the power converter 10, the reactors (L1, L2), and the capacitor C1 and eliminates or minimizes occurrence of a resonance in the power converter 10.

Even if a residual voltage exists across the capacitor C1, the power conversion apparatus 1 according to this embodiment restarts comparatively quickly while at the same time eliminating or minimizing occurrence of an overcurrent. This configuration eliminates or minimizes reduction in operation rate and the amount of power generation.

The power conversion apparatus 1 is not or least affected by the capacitance of the capacitor C1. This ensures increase in the capacitance of the capacitor C1 and decrease in size of the reactors (L1, L2). Thus, the power conversion apparatus 1 has a decreased size. Additionally, no discharge circuit is necessary in the power conversion apparatus 1. The unnecessity of discharge circuit, as well, ensures decrease in size of the power conversion apparatus 1.

2. Power Conversion Apparatus

Figure 2:
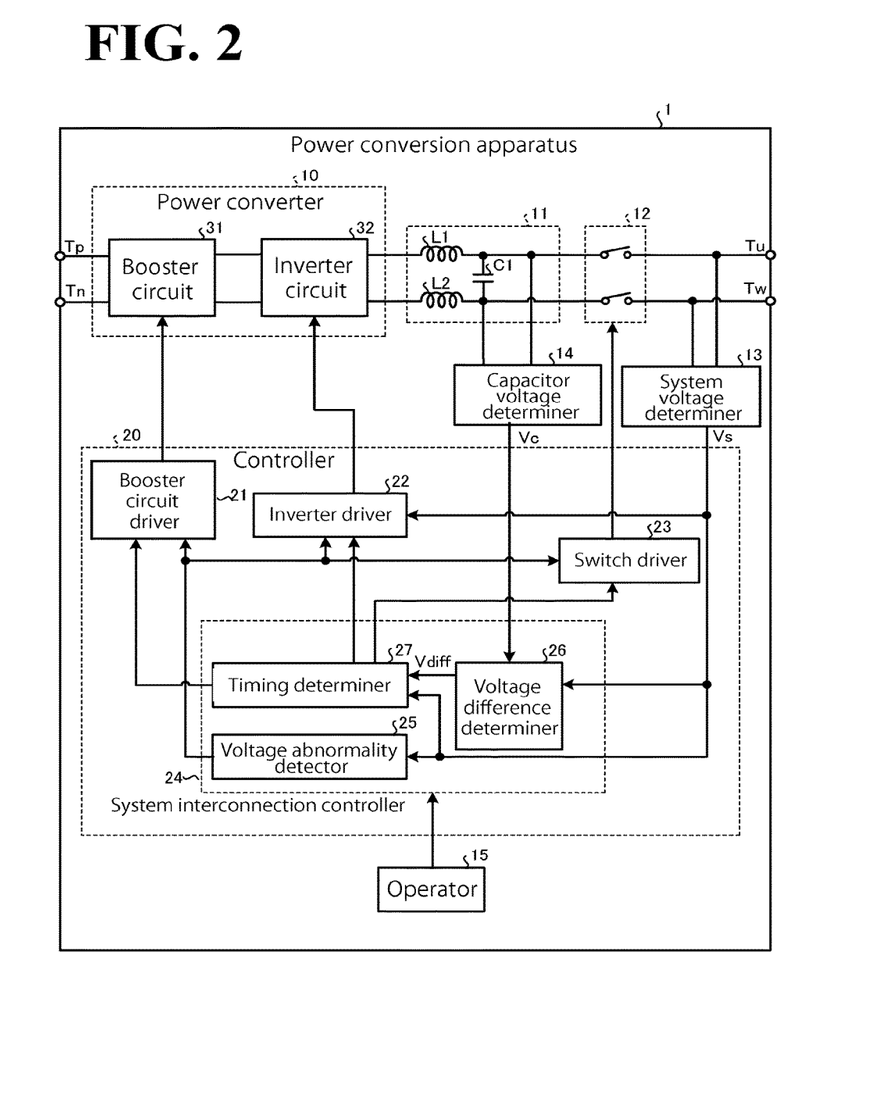
FIG. 2 is a diagram illustrating an exemplary configuration of the power conversion apparatus according to the embodiment.

Next, an exemplary configuration of the power conversion apparatus 1 according to this embodiment will be described. FIG. 2 is a diagram illustrating an exemplary configuration of the power conversion apparatus 1 according to this embodiment. In the example illustrated in FIG. 2, the power generator 2 is a DC power generator. Examples of the DC power generator include, but are not limited to, a solar cell (such as a solar panel), a DC generation machine, and a fuel.

As illustrated in FIG. 2, the power conversion apparatus 1 includes input terminals (Tp, Tn), output terminals (Tu, Tw), the power converter 10, the filter 11, the switches 12, a system voltage determiner 13, a capacitor voltage determiner 14, an operator 15, and the controller 20. The input terminals (Tp, Tn) are connected to the power generator 2, and the output terminals (Tu, Tw) are connected to the power system 3.

Figure 3:
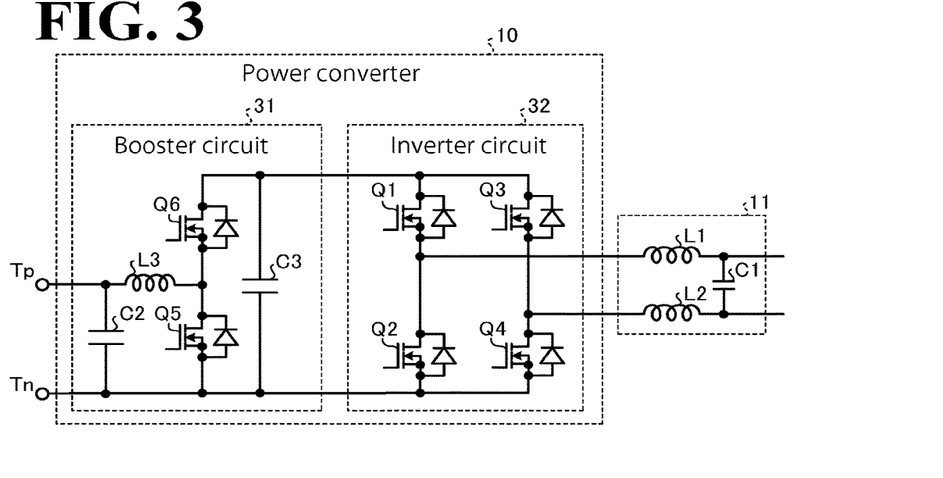
FIG. 3 is a diagram illustrating exemplary configurations of a booster circuit and an inverter circuit.

The power converter 10 includes a booster circuit 31 and an inverter circuit 32. FIG. 3 is a diagram illustrating exemplary configurations of the booster circuit 31 and the inverter circuit 32. In the examples illustrated in FIG. 3, the booster circuit 31 is a boost chopper-type booster circuit, and the inverter circuit 32 is a full-bridge inverter circuit. The booster circuit 31 and the inverter circuit 32, however, will not be limited to the examples illustrated in FIG. 3.

The system voltage determiner 13 determines the voltage between the output terminals (Tu, Tw), that is, the system voltage Vs. In this embodiment, the system voltage determiner 13 detects an instantaneous value of the voltage between the output terminals (Tu, Tw) so as to determine an instantaneous value of the system voltage Vs.

When the system voltage Vs cannot be detected due to an instantaneous interruption or some other cause, the system voltage determiner 13 estimates an instantaneous value of the system voltage Vs based on a value of the system voltage Vs detected before the instantaneous interruption, so as to determine an instantaneous value of the system voltage Vs. For example, the system voltage determiner 13 estimates as the system voltage Vs an instantaneous value of AC voltage whose phase changes continuously along with the system voltage Vs detected before the instantaneous interruption and whose frequency and amplitude are respectively identical to the frequency and amplitude of the system voltage Vs detected before the instantaneous interruption.

The capacitor voltage determiner 14 determines the voltage across both ends of the capacitor C1 (this voltage will be hereinafter referred to as capacitor voltage Vc). In one possible embodiment, the capacitor voltage determiner 14 detects the voltage across both ends of the capacitor C1 so as to determine the capacitor voltage Vc.

In another possible embodiment, the capacitor voltage determiner 14 estimates the capacitor voltage Vc based on an instantaneous value of the system voltage Vs detected at the time when AC voltage application to the capacitor C1 was stopped and based on discharge characteristics that the capacitor C1 has in the power conversion apparatus 1.

The discharge characteristics that the capacitor C1 has in the power conversion apparatus 1 depend on characteristics of the reactors (L1, L2). This is because the capacitor C1, the reactors (L1, L2), and the inverter circuit 32 form a closed circuit and the discharge current of the capacitor C1 depends on a resistance component of the reactors (L1, L2). Based on the characteristics of the reactors (L1, L2), the capacitor voltage determiner 14 is capable of estimating the level of reduction in the capacitor voltage Vc due to discharge of electricity from the capacitor C1.

The discharge characteristics of the capacitor C1 also depend on the capacitance of the capacitor C1. Based on the capacitance of the capacitor C1, as well as based on the characteristics of the reactors (L1, L2), the capacitor voltage determiner 14 is capable of estimating the level of reduction in the capacitor voltage Vc due to discharge of electricity from the capacitor C1. For example, the capacitor voltage determiner 14 estimates the discharge characteristics of the capacitor C1 using a time constant that is based on the capacitance of the capacitor C1 and the resistance component of the reactors (L1, L2). In still another possible embodiment, the capacitor voltage determiner 14 stores data of the discharge characteristics of the capacitor C1 (non-limiting examples of the data including a table and an arithmetic equation that correlate the capacitor voltage Vc with time), and estimates the capacitor voltage Vc based on the data.

As illustrated in FIG. 2, the controller 20 includes a booster circuit driver 21, an inverter driver 22, a switch driver 23, and a system interconnection controller 24. The booster circuit driver 21 and the inverter driver 22 are examples of the first driver and the application controller, and the switch driver 23 is an example of the second driver.

The controller 20 includes, for example: a micro-computer that includes a CPU (Central Processing Unit), a ROM (Read Only Memory), a RAM (Random Access Memory), and an input/output port; and various circuits. The CPU of the micro-computer reads and executes programs stored in the ROM to implement the functions of the booster circuit driver 21, the inverter driver 22, the switch driver 23, and the system interconnection controller 24. The CPU also reads and executes the programs to implement the functions of the system voltage determiner 13 and the capacitor voltage determiner 14.

It is also possible to use hardware alone to implement at least one or all of the booster circuit driver 21, the inverter driver 22, the switch driver 23, the system interconnection controller 24, the system voltage determiner 13, and the capacitor voltage determiner 14.

The booster circuit driver 21 controls the booster circuit 31 to boost the DC voltage generated by the power generator 2. When the booster circuit 31 has the configuration illustrated in FIG. 3, the booster circuit driver 21 repeats first processing and second processing. The first processing is to accumulate energy on a reactor L3, and the second processing is to accumulate the accumulated energy on a capacitor C3.

The booster circuit driver 21 turns a switching element Q5 on and a switching element Q6 off to perform the first processing, and turns the switching element Q5 off and the switching element Q6 on to perform the second processing.

The inverter driver 22 controls the inverter circuit 32 to output a voltage corresponding to the phase, frequency, and amplitude of the system voltage Vs determined by the system voltage determiner 13.

When the inverter circuit 32 has the configuration illustrated in FIG. 3, the inverter driver 22 performs PWM (Pulse Width Modulation) control to turn switching elements (Q1 to Q4) on and off so as to control the inverter circuit 32 to output a voltage corresponding to the phase, frequency, and amplitude of the system voltage Vs.

The switch driver 23 performs on/off control with respect to the switches 12 so as to connect and disconnect the power converter 10 and the power system 3 to and from each other.

The system interconnection controller 24 controls the booster circuit driver 21, the inverter driver 22, and the switch driver 23 to activate and deactivate the system interconnection.

For example, the system interconnection controller 24 activates and deactivates the system interconnection based on an input operation on the operator 15 by a person who installed the power conversion apparatus 1 or by a user. When the input operation on the operator 15 is an instruction operation to activate the system interconnection (this instruction operation will be hereinafter referred to as activation operation), the system interconnection controller 24 activates the system interconnection.

When the input operation on the operator 15 is an instruction operation to deactivate the system interconnection (this instruction operation will be hereinafter referred to as deactivation operation), the system interconnection controller 24 deactivates the system interconnection. The system interconnection controller 24 also activates and deactivates the system interconnection based on the state of the power system 3.

The system interconnection controller 24 includes a voltage abnormality detector 25, a voltage difference determiner 26, and a timing determiner 27. The voltage abnormality detector 25 detects an abnormality in the power system 3. For example, if the system voltage Vs continues to be equal to or less than a predetermined value for a predetermined period of time (for example, one second) after the system voltage Vs became equal to or less than the predetermined value, the voltage abnormality detector 25 determines that an abnormality exists in the power system 3.

When the voltage abnormality detector 25 has detected that an abnormality exists in the system voltage Vs, the voltage abnormality detector 25 controls the booster circuit driver 21, the inverter driver 22, and the switch driver 23. Under control by the voltage abnormality detector 25, the booster circuit driver 21 and the inverter driver 22 respectively control the booster circuit 31 and the inverter circuit 32 to stop the output of the AC voltage from the power converter 10, and the switch driver 23 turns the switches 12 off. Thus, the system interconnection is deactivated.

The voltage difference determiner 26 determines a difference between the system voltage Vs determined by the system voltage determiner 13 and the capacitor voltage Vc determined by the capacitor voltage determiner 14 (this difference will be hereinafter referred to as voltage difference Vdiff).

The timing determiner 27, in response to an activation operation, determines a timing that is based on the capacitor voltage Vc (this timing will be hereinafter referred to as activation timing) based on the voltage difference Vdiff and the system voltage Vs. Based on the determined activation timing, the timing determiner 27 controls the booster circuit driver 21, the inverter driver 22, and the switch driver 23.

The timing determiner 27, in response to a deactivation operation, determines a timing that is based on the capacitor voltage Vc (this timing will be hereinafter referred to as deactivation timing) based on the system voltage Vs. Based on the determined deactivation timing, the timing determiner 27 controls the booster circuit driver 21, the inverter driver 22, and the switch driver 23.

Figure 4:
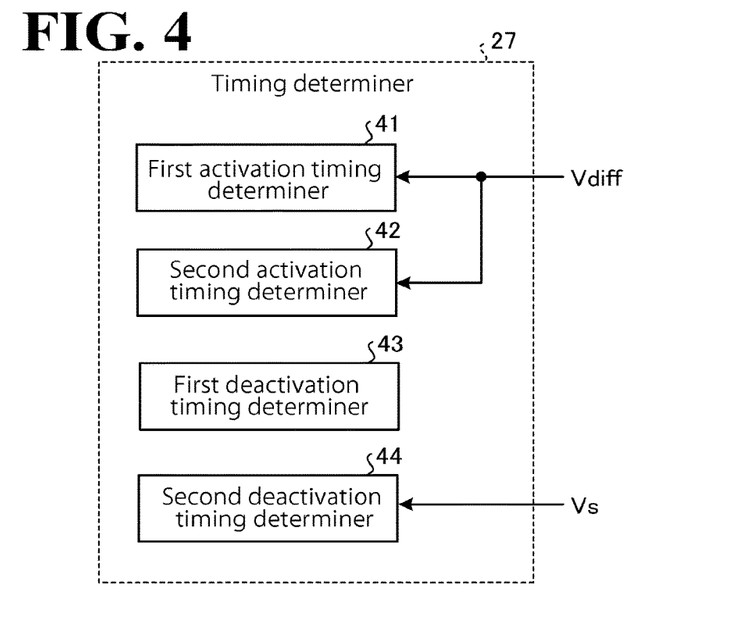
FIG. 4 is a diagram illustrating an exemplary configuration of a timing determiner.

FIG. 4 is a diagram illustrating an exemplary configuration of the timing determiner 27. As illustrated in FIG. 4, the timing determiner 27 includes a first activation timing determiner 41, a second activation timing determiner 42, a first deactivation timing determiner 43, and a second deactivation timing determiner 44.

The first activation timing determiner 41, in response to an activation operation, determines an activation timing based on the voltage difference Vdiff determined by the voltage difference determiner 26. Based on the determined activation timing, the first activation timing determiner 41 controls the booster circuit driver 21 and the inverter driver 22 to output from the power converter 10 a voltage corresponding to the system voltage Vs.

After the voltage corresponding to the system voltage Vs has been output from the power converter 10, the first activation timing determiner 41 controls the switch driver 23 to connect the power converter 10 and the power system 3 to each other.

The second activation timing determiner 42, in response to an activation operation, determines an activation timing based on the voltage difference Vdiff determined by the voltage difference determiner 26. Based on the determined activation timing, the second activation timing determiner 42 controls the switch driver 23 to connect the power converter 10 and the power system 3 to each other.

After the power converter 10 and the power system 3 have been connected to each other, the second activation timing determiner 42 controls the booster circuit driver 21 and the inverter driver 22 to output from the power converter 10 a voltage corresponding to the system voltage Vs.

It is noted that settings are made to operate either the first activation timing determiner 41 or the second activation timing determiner 42 alone. While in the example illustrated in FIG. 4 the timing determiner 27 includes the first activation timing determiner 41 and the second activation timing determiner 42, the timing determiner 27 may include one of the activation timing determiners alone.

The first deactivation timing determiner 43, in response to a deactivation operation, disregards the system voltage Vs and immediately controls the booster circuit driver 21, the inverter driver 22, and the switch driver 23 to deactivate the system interconnection.

The second deactivation timing determiner 44, in response to a deactivation operation, determines a deactivation timing based on the system voltage Vs. Based on the determined deactivation timing, the second deactivation timing determiner 44 controls the booster circuit driver 21, the inverter driver 22, and the switch driver 23 to deactivate the system interconnection.

It is noted that settings are made to operate either the first deactivation timing determiner 43 or the second deactivation timing determiner 44. While in the example illustrated in FIG. 4 the timing determiner 27 includes the first deactivation timing determiner 43 and the second deactivation timing determiner 44, the timing determiner 27 may include one of the deactivation timing determiners alone.

Figure 5:
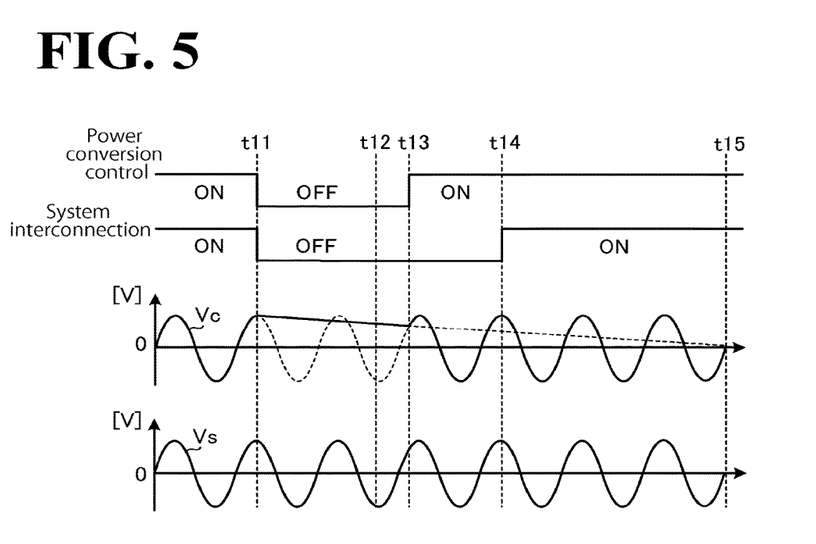
FIG. 5 illustrates an example of system interconnection control performed by a system interconnection controller.

FIG. 5 illustrates an example of system interconnection control performed by the system interconnection controller 24. Specifically, FIG. 5 indicates whether power conversion control performed by the power converter 10 is on or off, whether the connection to the power system 3 implemented by the switches 12 is on or off (this connection will be hereinafter referred to as system interconnection), levels of the capacitor voltage Vc, and levels of the system voltage Vs. The system interconnection control is performed by operating the first activation timing determiner 41 and the first deactivation timing determiner 43.

As illustrated in FIG. 5, until time t11, the system interconnection is on. Specifically, the switches 12 are on and thus the power converter 10 and the power system 3 are connected to each other. In this state, the power converter 10 is performing power conversion. The capacitor C1 repeats charge and discharge of electricity due to the system voltage Vs or the AC voltage across the power converter 10. This makes the capacitor voltage Vc and the system voltage Vs identical or similar to each other.

When a deactivation operation is made at time t11, the first deactivation timing determiner 43 turns the switches 12 off and controls the booster circuit driver 21 and the inverter driver 22 to turn off the power conversion operation performed by the power converter 10. When the power conversion control is stopped, the system interconnection is cut and thus the system interconnection is deactivated.

At time t11, at which the system interconnection is deactivated, the system voltage Vs is not zero. This makes the capacitor voltage Vc identical or similar to a level of the system voltage Vs immediately before the switches 12 were cut, as illustrated in FIG. 5. That is, the capacitor C1 has a residual voltage. In other words, the capacitor C1 is in a state of being charged by the system voltage Vs or the AC voltage across the power converter 10.

While the system interconnection is deactivated, the electric charge accumulated on the capacitor C1 is gradually released in the closed circuit, which includes the capacitor C1 and the reactors (L1, L2). The gradual release of the electric charge causes the capacitor voltage Vc to gradually reduce. It takes time, however, until the capacitor voltage Vc becomes zero (as indicated by time t15 in FIG. 5).

In this state, an activation operation may be made at time t12. In this case, the first activation timing determiner 41 determines an activation timing that is based on the capacitor voltage Vc (time t13 illustrated in FIG. 5). At the determined activation timing, the first activation timing determiner 41 starts controlling the booster circuit driver 21 and the inverter driver 22 to output from the power converter 10 a voltage corresponding to the system voltage Vs.

The timing that is based on the capacitor voltage Vc is determined by the timing determiner 27 based on the determination made by the voltage difference determiner 26. The timing that is based on the capacitor voltage Vc is the activation timing and the timing at which to control the power converter 10 to output the voltage corresponding to the system voltage Vs.

The first activation timing determiner 41 determines, as the activation timing, a timing at which the voltage difference Vdiff becomes equal to or less than a threshold Vth. At the determined activation timing, the first activation timing determiner 41 controls the booster circuit driver 21 and the inverter driver 22 to output from the power converter 10 the voltage corresponding to the system voltage Vs.

When the threshold Vth is set at, for example, zero, the timing determiner 27 determines, as the activation timing, a timing at which the system voltage Vs and the capacitor voltage Vc match. At the determined activation timing, the timing determiner 27 starts controlling the power converter 10 to output the voltage corresponding to the system voltage Vs. This configuration improves preciseness in eliminating or minimizing occurrence of an overcurrent between the power converter 10 and the capacitor C1.

It is noted that the threshold Vth will not be limited to zero; any other value is possible insofar as no overcurrent occurs that would affect the power conversion apparatus 1. The current, Io, flowing between the power converter 10 and the capacitor C1 can be represented by Io=Vdiff/(2×RL), under the assumption that resistance components other than the resistance component, RL, of the reactors (L1, L2) can be disregarded. When the current to is intended to be equal to or less than its limitation value Io, the threshold Vth is set so that Vth≤Iom×(2×RL).

When there is a delay between the time when the power converter 10 starts controlling and the time when the power converter 10 starts outputting the voltage corresponding to the system voltage Vs, the threshold Vth is set while taking the delay into consideration. Taking the delay into consideration in setting the threshold Vth ensures appropriate adjustment of the timing at which to output from the power converter 10 the voltage corresponding to the system voltage Vs.

When, for example, the voltage difference Vdiff at the time when the activation operation is made is equal to or less than the threshold Vth, the power converter 10 immediately starts the control to output from the power converter 10 the voltage corresponding to the system voltage Vs. This configuration ensures comparatively quick start of the AC voltage application control.

The timing determiner 27 controls the switches 12 to turn on at time t4, which is a predetermined period of time later than when the timing determiner 27 controlled the inverter driver 22 to output from the power converter 10 the voltage corresponding to the system voltage Vs. With the switches 12 turned on, the power converter 10 and the power system 3 are connected to each other and the system interconnection starts.

Thus, after the connection between the power system 3 and the power converter 10 has been cut by the switches 12, the system interconnection controller 24 of the controller 20 restarts the control to apply the AC voltage to the capacitor C1 at the timing that is based on the capacitor voltage Vc. This configuration ensures that even if a residual voltage exists across the capacitor C1 at the time when the connection between the power system 3 and the power converter 10 is cut, no or minimal overcurrent occurs when the power converter 10 starts outputting the AC voltage corresponding to the power system 3.

After the connection between the power system 3 and the power converter 10 have been cut by the switches 12, even if the electric charge accumulated on the capacitor C1 is being discharged through the reactors (L1, L2), the controller 20 starts the AC voltage application control at the timing that is based on the capacitor voltage Vc. Thus, even if the residual voltage across the capacitor C1 changes, no or minimal overcurrent occurs when the power converter 10 starts outputting the AC voltage corresponding to the power system 3.

The system interconnection controller 24 of the controller 20 includes the voltage difference determiner 26 and the timing determiner 27. The voltage difference determiner 26 determines a difference between the system voltage Vs determined by the system voltage determiner 13 and the capacitor voltage Vc determined by the capacitor voltage determiner 14. Based on the determination made by the voltage difference determiner 26, the timing determiner 27 determines the timing at which to start the AC voltage application control. Thus, the AC voltage application control starts at a timing that is based on the difference between the capacitor voltage Vc and the system voltage Vs. This configuration ensures preciseness in eliminating or minimizing occurrence of an overcurrent.

The system voltage determiner 13 estimates the capacitor voltage Vc based on the characteristics of the reactors (L1, L2) so as to determine the capacitor voltage Vc. This configuration eliminates the need for directly detecting the voltage across both ends of the capacitor C1 in determining the capacitor voltage Vc, and enables the system voltage determiner 13 to be incorporated in the controller 20. This provides advantageous effects such as reduction in size of the power conversion apparatus 1.

Figure 6:
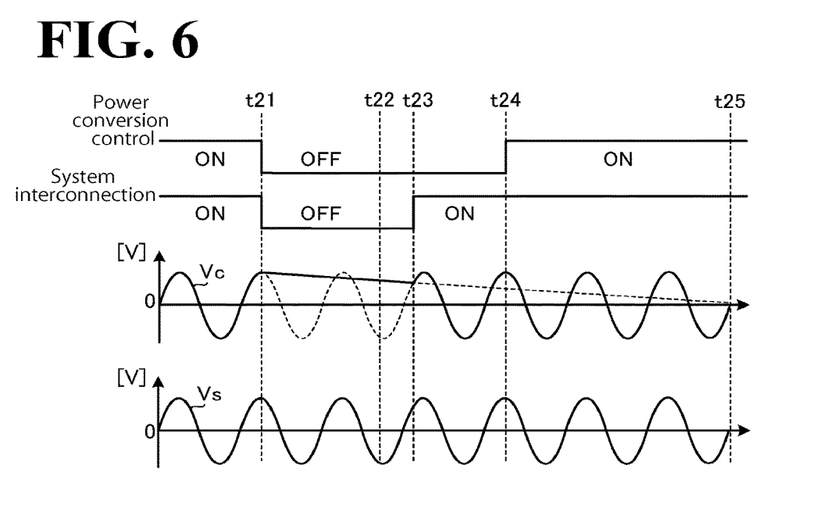
FIG. 6 is a diagram illustrating another example of the system interconnection control performed by the system interconnection controller.

The system interconnection controller 24 is capable of performing different system interconnection control from the system interconnection control illustrated in FIG. 5. FIG. 6 is a diagram illustrating another example of the system interconnection control performed by the system interconnection controller 24. Similarly to FIG. 5, FIG. 6 indicates whether the power conversion control is on or off, whether the system interconnection is on or off, levels of the capacitor voltage Vc, and levels of the system voltage Vs.

The system interconnection control illustrated in FIG. 6 is performed by operating the second activation timing determiner 42 and the first deactivation timing determiner 43. It is noted that the system interconnection control illustrated up to t22 in FIG. 6 is similar to the system interconnection control illustrated up to t12 in FIG. 5, and will not be elaborated here.

When an activation operation is made at time t22, the second activation timing determiner 42 turns the switches 12 on so that the power converter 10 and the power system 3 are connected to each other at a timing that is based on the capacitor voltage Vc (time t23 illustrated in FIG. 6).

Similar to the first activation timing determiner 41, the second activation timing determiner 42 determines, as voltage application start timing, a timing at which the voltage difference Vdiff becomes equal to or less than the threshold Vth. At the timing at which the voltage difference Vdiff becomes equal to or less than the threshold Vth, the second activation timing determiner 42 controls the switches 12 to connect the power converter 10 and the power system 3 to each other.

The threshold Vth is set while taking into consideration the ON-delay phenomenon occurring between the time when the control of the switches 12 starts and the time when the switches 12 turn on. Taking the ON-delay phenomenon into consideration in setting the threshold Vth makes adjustable the timing at which to connect the power converter 10 and the power system 3 to each other.

When, for example, the voltage difference Vdiff at the time when the activation operation is made is equal to or less than the threshold Vth, the power converter 10 immediately starts the control to connect the power converter 10 and the power system 3 to each other. This configuration ensures comparatively quick start of the AC voltage application control.

The second activation timing determiner 42 starts controlling the booster circuit driver 21 and the inverter driver 22 at time t24, which is a predetermined period of time later than when the second activation timing determiner 42 controlled the switches 12 to connect the power converter 10 and the power system 3 to each other.

Thus, after the connection between the power system 3 and the power converter 10 have been cut by the switches 12, the system interconnection controller 24 of the controller 20 connects the power converter 10 and the power system 3 to each other at the timing that is based on the capacitor voltage Vc. This configuration ensures that even if a residual voltage exists across the capacitor C1 at the time when the connection between the power system 3 and the power converter 10 is cut, no or minimal overcurrent occurs between the capacitor C1 and the power system 3. This, as a result, eliminates or minimizes degradation of, for example, the capacitor C1 and the switches 12, and eliminates or minimizes adverse effects to the power system 3.

In another possible embodiment, the second activation timing determiner 42 controls the switches 12, the booster circuit driver 21, and the inverter driver 22 to make the timing of voltage output from the power converter 10 concurrent with the timing at which to connect the power converter 10 and the power system 3 to each other.

In another possible embodiment, the system interconnection controls illustrated in FIGS. 5 and 6 are performed by operating the second deactivation timing determiner 44 instead of the first deactivation timing determiner 43. In this case, the second deactivation timing determiner 44, in response to a deactivation operation, controls the switches 12 to separate the power system 3 from the power converter 10 at a timing at which the system voltage Vs becomes equal to the reference voltage Vref.

This configuration enables the capacitor voltage Vc at the time when the power system 3 is separated from the power converter 10 to be a particular value of voltage. Making the capacitor voltage Vc a particular value of voltage makes the capacitor voltage Vc recognizable at the time when the system interconnection stops. This configuration enables the capacitor voltage determiner 14 to readily estimate the capacitor voltage Vc based on the discharge characteristics of the capacitor C1 from the time when the system interconnection stops in the power conversion apparatus 1.

In this respect, making the reference voltage Vref zero enables the capacitor voltage Vc at the time when the system interconnection stops to be zero. In this manner as well, the capacitor voltage Vc can be readily estimated. In another possible embodiment, the system interconnection controller 24 starts the AC voltage application control at a zero crossing point of the system voltage Vs.

It is noted that when the switches 12 have an OFF-delay phenomenon, the reference voltage Vref is set while taking the OFF-delay phenomenon into consideration. This enables the capacitor voltage Vc to be a particular value of voltage at the time when the system interconnection stops.

3. System Interconnection Processing by Power Conversion Apparatus

Figure 7:
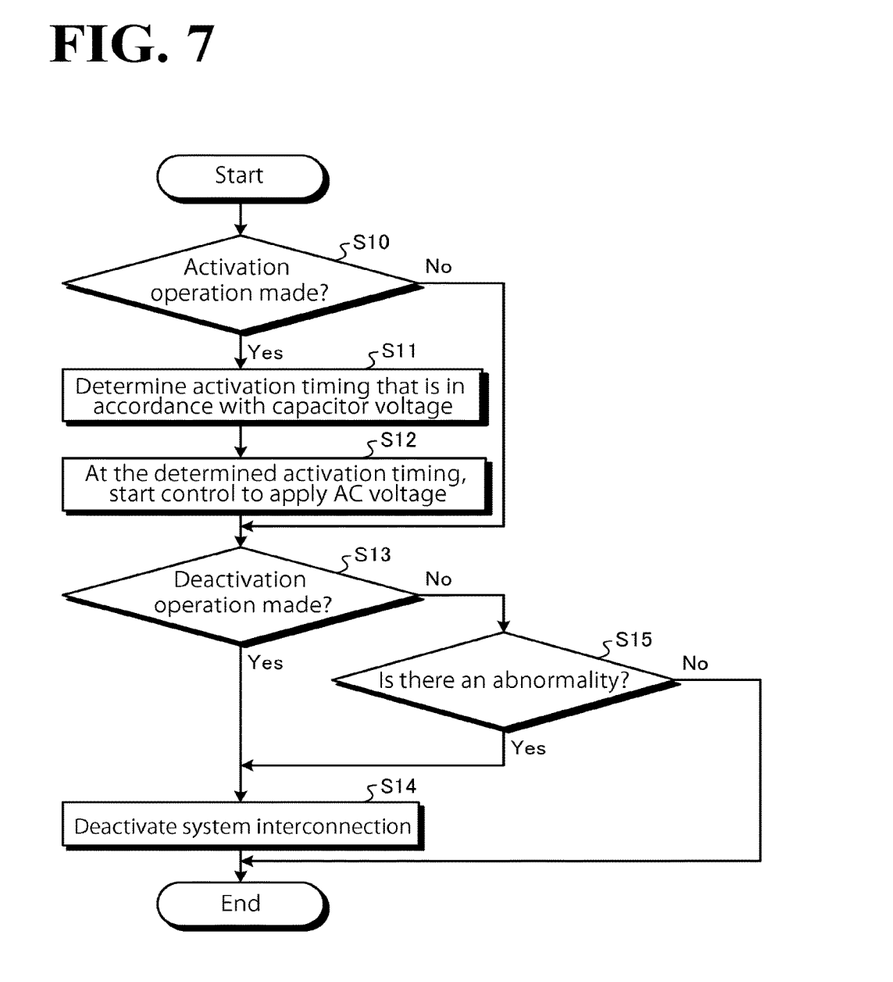
FIG. 7 is a flowchart of an example of system interconnection processing performed by the power conversion apparatus.

Next, system interconnection processing performed by the power conversion apparatus 1 will be described. FIG. 7 is a flowchart of an example of the system interconnection processing performed by the power conversion apparatus 1. The system interconnection processing is repeated by the controller 20.

As illustrated in FIG. 7, the controller 20 determines whether an activation operation has been made (S10). When the controller 20 determines that an activation operation has been made (Yes at S10), the controller 20 determines an activation timing that is based on the capacitor voltage Vc (S11). Then, the controller 20 starts, at the determined activation timing, control to apply AC voltage (S12).

When at S10 the controller 20 determines that no activation operation has been made (No at S10) or when the processing at S12 ends, the controller 20 determines whether a deactivation operation has been made (S13).

When at S13 the controller 20 determines that a deactivation operation has been made (Yes at S13), the controller 20 deactivates the system interconnection (S14). In this processing, the controller 20 controls the switches 12 at, for example, a timing at which the system voltage Vs becomes equal to the reference voltage Vref to separate the power system 3 from the power converter 10. Then, the controller 20 controls the power converter 10 to stop the AC voltage output from the power converter 10.

When at S13 the controller 20 determines that no deactivation operation has been made (No at S13), the controller 20 determines whether there is an abnormality in the power system 3 (S15). When the controller 20 determines that there is an abnormality in the power system 3 (Yes at S15), the controller 20 causes the processing to proceed to S14.

When the processing at S14 ends or when at S15 the controller 20 determines that there is no abnormality in the power system 3 (No at S15), the controller 20 ends the processing illustrated in FIG. 7.

Thus, at the timing that is based on the voltage across the capacitor C1, which is disposed between the power system 3 and the power converter 10, the controller 20 starts the control to apply AC voltage to the capacitor C1. This configuration eliminates or minimizes occurrence of an overcurrent while implementing comparatively quick application of AC voltage to the capacitor C1.

Thus, the capacitor C1 is a "capacitor disposed between the electric power system and the power converter". The switches 12, the power converter 10, and the controller 20 function as "means for, with a residual voltage existing across the capacitor, applying an AC voltage to the capacitor at a time at which to eliminate or minimize occurrence of an overcurrent".

The above-described embodiment has been described as eliminating or minimizing occurrence of an overcurrent between the capacitor C1 of the filter 11 and the power converter 10 or the power system 3. The capacitor C1 of the filter 11, however, should not be construed in a limiting sense. Any other capacitor is possible, whether the capacitor is disposed in the power converter 10 and/or the switches 12, insofar as overcurrent is attributable to the capacitor. In the above-described embodiment, the filter 11 has been described as an LC filter. Another possible embodiment is that the filter 11 is an LCL filter.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A power conversion apparatus, comprising:
   power conversion circuitry configured to convert first power supplied from a power source into AC power corresponding to second power of a power system; and
   control circuitry configured to instruct, at a first time that is determined based on a first difference between a voltage across a capacitor and a second AC voltage across the power system, the power conversion circuitry to start applying a first AC voltage to the capacitor, wherein
   the capacitor is disposed between the power system and the power conversion circuitry.

2. The power conversion apparatus according to claim 1, wherein the voltage across the capacitor corresponds to a level of a residual voltage across the capacitor.

3. The power conversion apparatus according to claim 1, wherein the control circuitry is configured to instruct, when the first difference between the voltage across the capacitor and the second AC voltage across the power system is equal to or less than a threshold, the power conversion circuitry to start applying the first AC voltage to the capacitor.

4. The power conversion apparatus according to claim 1, further comprising:
   a switch disposed between the power system and the capacitor and configured to connect the power system and the power conversion circuitry to each other,
   wherein after the power system and the power conversion circuitry have been disconnected from each other by the switch, the control circuitry is configured to instruct, at a second time that is determined based on the voltage across the capacitor, the power conversion circuitry to restart application of the first AC voltage to the capacitor.

5. The power conversion apparatus according to claim 1, wherein during electric discharge from the capacitor that has been charged by the second AC voltage across the power system or by a third AC voltage across the power conversion circuitry, the control circuitry is further configured to instruct, at a second time that is determined based on the voltage across the capacitor, the power conversion circuitry to restart application of the first AC voltage to the capacitor.

6. The power conversion apparatus according to claim 1, further comprising:
   capacitor voltage determination circuitry configured to determine the voltage across the capacitor; and
   system voltage determination circuitry configured to determine the second AC voltage across the power system,
   wherein the control circuitry is further configured to determine the difference between the voltage across the capacitor and the second AC voltage across the power system.

7. The power conversion apparatus according to claim 6, further comprising:
   a reactor disposed between the capacitor and the power conversion circuitry,
   wherein the system voltage determination circuitry is configured to estimate the voltage across the capacitor based on a characteristic of the reactor in order to determine the voltage across the capacitor.

8. The power conversion apparatus according to claim 6, wherein the control circuitry is further configured to determine, as the first time at which the power conversion circuitry is instructed to start applying the first AC voltage to the capacitor, a time at which the voltage across the capacitor and the second AC voltage across the power system match.

9. The power conversion apparatus according to claim 1, further comprising:
   a switch disposed between the power system and the capacitor and configured to connect the power system and the power conversion circuitry to each other,
   wherein the control circuitry is configured to instruct, from a state in which the power conversion circuitry and the power system are connected to each other by the switch, the switch to separate the power system from the power conversion circuitry at a third time that is determined based on the second AC voltage across the power system.

10. The power conversion apparatus according to claim 1, further comprising:
    a switch disposed between the power system and the capacitor and configured to connect the power system and the power conversion circuitry to each other,
    wherein the control circuitry is configured to instruct the switch to start, at a fourth time that is determined based on the voltage across the capacitor, applying the second AC voltage across the power system to the capacitor.

11. The power conversion apparatus according to claim 10, wherein the control circuitry is further configured to detect an abnormality in the power system, and when the abnormality is detected in the power system, the control circuitry is configured to instruct, at a time of detection of the abnormality, the switch to separate the power system from the power conversion circuitry.

12. The power conversion apparatus according to claim 1, wherein the capacitor is included in a filter disposed between the power system and the power conversion circuitry.

13. The power conversion apparatus according to claim 2, wherein the control circuitry is configured to instruct, when the first difference between the voltage across the capacitor and the second AC voltage across the power system is equal to or less than a threshold, the power conversion circuitry to start applying the first AC voltage to the capacitor.

14. The power conversion apparatus according to claim 2, further comprising:
    a switch disposed between the power system and the capacitor and configured to connect the power system and the power conversion circuitry to each other,
    wherein after the power system and the power conversion circuitry have been disconnected from each other by the switch, the control circuitry is configured to instruct, at a second time that is determined based on the voltage across the capacitor, the power conversion circuitry to restart application of the first AC voltage to the capacitor.

15. The power conversion apparatus according to claim 3, further comprising:
    a switch disposed between the power system and the capacitor and configured to connect the power system and the power conversion circuitry to each other,
    wherein after the power system and the power conversion circuitry have been disconnected from each other by the switch, the control circuitry is configured to instruct, at a second time that is determined based on the voltage across the capacitor, the power conversion circuitry to restart application of the first AC voltage to the capacitor.

16. The power conversion apparatus according to claim 14, wherein after the power system and the power conversion circuitry have been disconnected from each other by the switch, the control circuitry is configured to instruct, at a fifth time that is determined based on the voltage across the capacitor, the power conversion circuitry to control the switch to connect the power conversion circuitry to the power system.

17. The power conversion apparatus according to claim 2, wherein during electric discharge from the capacitor that has been charged by the second AC voltage across the power system or by a third AC voltage across the power conversion circuitry, the control circuitry is further configured to instruct, at a second time that is determined based on the voltage across the capacitor, the power conversion circuitry to restart application of the first AC voltage to the capacitor.

18. The power conversion apparatus according to claim 3, wherein during electric discharge from the capacitor that has been charged by the second AC voltage across the power system or by a third AC voltage across the power conversion circuitry, the control circuitry is further configured to instruct, at a second time that is determined based on the voltage across the capacitor, the power conversion circuitry to restart application of the first AC voltage to the capacitor.

19. A power generation system, comprising:
a power conversion apparatus including
power conversion circuitry configured to convert first power into AC power corresponding to second power of a power system, and
control circuitry configured to instruct, at a time that is determined based on a first difference between a voltage across a capacitor and a second AC voltage across the power system, the power conversion circuitry to start applying a first AC voltage to the capacitor; and
power generating circuitry connected to the power conversion circuitry and configured to generate the first power and supply the first power to the power conversion apparatus which outputs the AC power to the power system, wherein
the capacitor is disposed between the power system and the power conversion circuitry.

20. A control method, comprising:
determining a time based on a voltage across a capacitor and a second AC voltage across a power system, the capacitor being disposed between the power system and power conversion circuitry configured to convert first power supplied from a power source into first AC power corresponding to second power of the power system; and
instructing, using control circuitry and at the time that is determined based on the difference between the voltage across the capacitor and the second AC voltage across the power system, the power conversion circuitry to start applying the first AC voltage to the capacitor.

* * * * *